Patented Aug. 2, 1932

1,869,490

UNITED STATES PATENT OFFICE

JOHN MURSCH, OF TEANECK, NEW JERSEY, ASSIGNOR TO JOSEPH GATTI, OF NEW YORK, N. Y.

METHOD OF PRODUCING MOLDABLE COMPOUND

No Drawing.      Application filed April 29, 1931. Serial No. 533,793.

The present invention relates to a process of utilizing waste material such as news print and the like for the production of moldable compounds.

According to the present invention, I propose to utilize this waste material by reducing it in dry condition to a finely divided state, and in this condition combining with the fibre a synthetic resin which, when properly combined with the fibre, produces a compound which may be satisfactorily molded when subjected to curing temperatures and pressures.

As an example of a method of procedure which I have found satisfactory, I reduce waste paper in the form of news print, book paper and the like, or waste rags or the like, to a finely divided condition through a hammer mill. This operation converts the waste fibre to a finely divided condition in dry form. Having thus mechanically prepared the fibre, I then thoroughly mix it at room temperatures with liquid cresylic acid, liquid formaldehyde, water and caustic soda in the proportion by weight of one pound of fibre, approximately, one pound of cresylic acid, one pound of formaldehyde, and one ounce of caustic soda, to all of which is added about 10% of water. This is thoroughly mixed and boiled, the operation being preferably carried out in a steam heated kettle heated with five to ten pounds steam pressure, the reaction of the caustic soda together with the artificial heat promoting boiling of the mix. When the mixture has been completed, it may be removed in a plastic, dough-like form, in which it is either dried or spread into sheets, or molded directly, all before curing. If so desired, the dough-like material may be calendered on to or into a fabric sheet or, in fact, treated in a similar fashion to any dough-like mixture. After so prepared, the mixture may be cured in either molded or sheet form by subjection to curing temperatures and pressures.

This method has the definite advantage that the mixture of fibre and resin is uniform and the impregnation is complete without liability of dry spots or unimpregnated portions of fibre, which may introduce a weakness into the resulting product. The thoroughness and uniformity of impregnation may be in part due to the fact that with this method the acid and formaldehyde are first added to the fibre, thoroughly biting into and impregnating the fibre so that development of the resin takes place within the fibrous structure itself rather than causing a more superficial coating by the developed resin.

This method of procedure is perhaps best adapted to the production of the product in sheet form, as the introduction of this dough-like mixture directly into a mold may conceivably create problems in connection with the liberation of volatile materials within the mixture during curing.

What is claimed is:—

The method of producing moldable material which consists in preparing fibre in a finely divided dry state, mixing the dry fibre with cresylic acid, formaldehyde and caustic soda in the presence of water, boiling the resulting mixture to convert into synthetic resin, and finally curing the resultant plastic and dough-like substance.

In testimony whereof I have signed my name to this specification.

JOHN MURSCH.